(12) United States Patent
Singh et al.

(10) Patent No.: US 8,688,159 B1
(45) Date of Patent: Apr. 1, 2014

(54) METHOD AND APPARATUS FOR USE OF EXPECTED SIGNAL STRENGTH DIFFERENCE TO IMPROVE CHANNEL SELECTION

(75) Inventors: Jasinder P. Singh, Olathe, KS (US); Maulik K. Shah, Overland Park, KS (US); Jason P. Sigg, Overland Park, KS (US); Ashish Bhan, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 599 days.

(21) Appl. No.: 13/012,046

(22) Filed: Jan. 24, 2011

(51) Int. Cl.
*H04B 17/00* (2006.01)

(52) U.S. Cl.
USPC ............... 455/509; 455/67.13; 455/226.1

(58) Field of Classification Search
USPC ................... 455/509, 67.13, 226.1
See application file for complete search history.

(56) References Cited

U.S. PATENT DOCUMENTS

| | | | |
|---|---|---|---|
| 5,519,884 A | 5/1996 | Duque-Anton et al. | |
| 5,552,798 A * | 9/1996 | Dietrich et al. | 343/893 |
| 5,649,291 A * | 7/1997 | Tayloe | 370/332 |
| 6,212,388 B1 * | 4/2001 | Seo | 455/450 |
| 6,650,912 B2 * | 11/2003 | Chen et al. | 455/574 |
| 7,590,389 B2 * | 9/2009 | Anderson | 455/67.7 |
| 8,126,465 B2 * | 2/2012 | Lu et al. | 455/436 |
| 2004/0002340 A1 * | 1/2004 | Lim et al. | 455/450 |
| 2006/0183429 A1 * | 8/2006 | Anderson | 455/67.13 |
| 2006/0291401 A1 * | 12/2006 | Yuen et al. | 370/252 |
| 2006/0292988 A1 * | 12/2006 | Yuen et al. | 455/62 |
| 2008/0019324 A1 * | 1/2008 | Matsumoto et al. | 370/335 |
| 2009/0016313 A1 * | 1/2009 | Wu | 370/345 |
| 2009/0109929 A1 * | 4/2009 | Quan et al. | 370/332 |
| 2009/0197554 A1 * | 8/2009 | Shi et al. | 455/226.2 |
| 2009/0291644 A1 * | 11/2009 | Suwa et al. | 455/77 |
| 2010/0087195 A1 * | 4/2010 | Lu et al. | 455/436 |
| 2010/0099404 A1 * | 4/2010 | Khoo et al. | 455/433 |
| 2010/0120413 A1 * | 5/2010 | Kennedy et al. | 455/423 |
| 2010/0238871 A1 * | 9/2010 | Tosic et al. | 370/329 |
| 2011/0111713 A1 * | 5/2011 | Park et al. | 455/154.1 |
| 2012/0026970 A1 * | 2/2012 | Winters et al. | 370/330 |
| 2012/0119884 A1 * | 5/2012 | Nehrig et al. | 340/10.4 |
| 2013/0176869 A1 * | 7/2013 | Finlow-Bates et al. | 370/252 |

* cited by examiner

*Primary Examiner* — Bobbak Safaipour

(57) ABSTRACT

Disclosed is a mechanism for efficient channel selection in a wireless communication system. A wireless communication device (WCD) receives from a radio access network (RAN) a channel list message that specifies channels on which the RAN communicates in a coverage area. Further, the WCD receives from the RAN for at least a given one of the channels an expected delta value indicating an expected difference in signal strength between that channel and another channel. The WCD may then take an actual measurement of signal strength on the other channel and apply the expected delta to predict a signal strength of the given channel. Based on the predicted signal strength being threshold low, the WCD may then select a channel other than the given channel on which to communicate with the RAN, and the WCD may then communicate with the RAN on the selected channel.

19 Claims, 5 Drawing Sheets

CHANNEL LIST MESSAGE

| A | B | C |
|---|---|---|
| PRIMARY | $\Delta_{A-B}$ | $\Delta_{A-C}$ |

Fig. 2

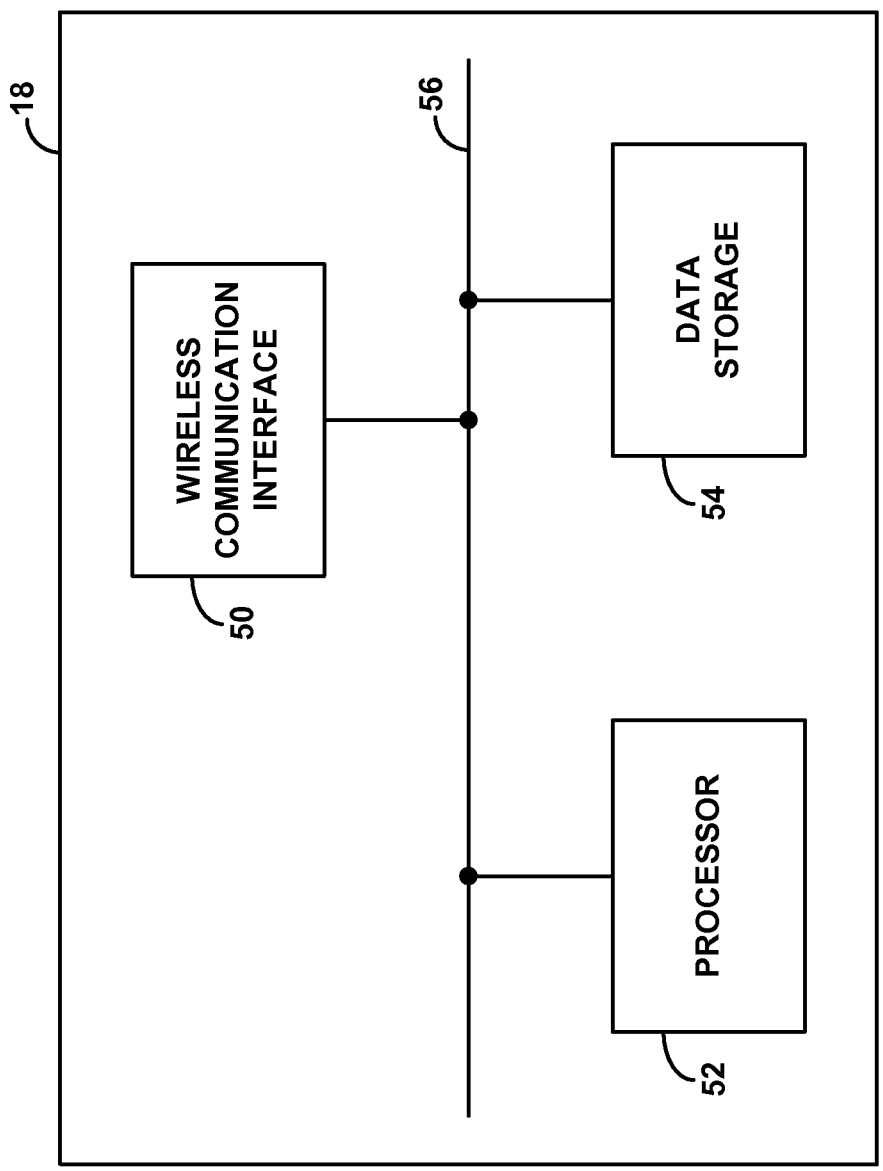

METHOD AND APPARATUS FOR USE OF EXPECTED SIGNAL STRENGTH DIFFERENCE TO IMPROVE CHANNEL SELECTION

BACKGROUND

To provide cellular wireless communication service, a wireless service provider typically operates a radio access network (RAN) that defines coverage areas in which subscriber devices can be served by the RAN and can thereby obtain connectivity to broader networks such as the public switched telephone network (PSTN) and the Internet.

A typical RAN may include one or more base transceiver stations (BTSs) (e.g., macro network cell towers and/or femtocells), each of which may radiate to define one or more wireless coverage areas such as cells and cell sectors in which subscriber devices can operate. Further, the RAN may include one or more radio network controllers (RNCs) or the like, which may be integrated with or otherwise in communication with the BTSs, and which may include or be in communication with a switch or gateway that provides connectivity with one or more transport networks. Conveniently with this arrangement, a cell phone, personal digital assistant, wirelessly equipped computer, or other subscriber device that is positioned within coverage of the RAN can then communicate with a BTS and in turn, via the BTS, with other served devices or with other entities on the transport network.

In each coverage area, a RAN will typically broadcast a pilot signal that serves to notify subscriber devices of the presence of the coverage area. In practice, when a subscriber device enters into a coverage area and detects a pilot signal of a sufficient strength, the device may transmit a registration message to the RAN to notify the RAN that the device is in the coverage area, and the device may then operate in an "idle" mode in the coverage area. In the idle mode, the device is not actively engaged in a call or other traffic communication, but the device regularly monitors overhead signals in the coverage area to obtain system information and page messages for instance.

When a RAN seeks to connect a call or other communication to an idle subscriber device, the RAN may transmit a page message to the device in the coverage area where the device last registered. Upon detecting the page message, the device may then respond to the RAN. The RAN may then connect the communication to the device, thereby transitioning the device to an "active" state.

In general, wireless communications between a RAN and subscriber devices may occur on one or more carrier frequencies, also referred to as channels. A channel can take any of a variety of forms. By way of example, a channel can be defined as a specific frequency block, such as a 1.25 MHz block or a 5 MHz block in a profile frequency band used by the wireless service provider, such as 800 MHz (cellular band), 1.9 GHz (PCS band), or 2.5 GHz (BRS/EBS band). For instance, if a wireless service provider operates in the 800 MHz cellular band, coverage areas of the wireless service provider's RAN will typically operate with channels defined near 800 MHz. And if a wireless service provider operates in the 1.9 GHz band, coverage areas of the wireless service provider's RAN will typically operate with channels defined near 1.9 GHz. In practice, each channel may actually be defined as one frequency block for "forward link" communications from the RAN to subscriber devices and a corresponding but separate frequency block for "reverse link" communications from subscriber devices to the RAN.

On a given channel, communications between the RAN and subscriber devices may then further be carried on various sub-channels, also themselves referred to as channels. The forward-link, for instance, may define a pilot channel for carrying the pilot signal noted above and may further define a paging channel to carry page messages to subscriber devices, other overhead channels to carry system parameter information and the like, and a number of traffic channels to carry bearer traffic (e.g., call traffic) to subscriber devices. The reverse-link, on the other hand, may define an access channel to carry call-initiation messages and the like, and a number of traffic channels to carry bearer traffic to the RAN.

Each of these sub-channels may be defined in various ways, such as through code-division multiplexing or time-division multiplexing for instance. In a CDMA system, for example, communications in a given coverage area are typically spread spectrum modulated with a pseudo-noise offset (PN-offset) code associated with the coverage area, and various sub-channels such as the pilot channel, paging channel, and traffic channels are further spread spectrum modulated with a Walsh code specific to the sub-channel. In other systems, such as CDMA 1xEV-DO systems for instance, the various sub-channels may be defined through time-division multiplexing on the channel carrier frequency. Other examples are possible as well.

A coverage area that has a relatively low level of traffic, such as in a rural environment, may be engineered to operate with a single channel, such as a single 1.25 MHz frequency block (or pair of blocks) in the wireless service provider's profile frequency band. On the other hand, a coverage area that has a relatively high level of traffic, such as in an urban environment, may be engineered to operate with multiple channels, such as multiple 1.25 MHz frequency blocks (or pairs of blocks) in the wireless service provider's profile frequency band. Addition of channels to a coverage area serves to multiply coverage capacity in the coverage area.

When a subscriber device enters into a coverage are that provides service on multiple channels, an issue for the subscriber device is which channel the device should idle on. For instance, if a coverage area provides service on channels A, B, and C in a given coverage area, a subscriber device entering the coverage area my need to determine whether to idle on channel A, on channel B, or on channel C. Correspondingly, the RAN itself may also need to determine which channel the subscriber device will idle on, so that the RAN can direct any applicable page messages to the subscriber device on that channel.

To facilitate selection of a channel, a RAN may broadcast in each coverage area a "channel list message" (CLM) that lists the channels on which the RAN communicates in the coverage area, and a subscriber device may be arranged to receive the CLM and to apply a predefined channel-selection process to select a channel from among those listed in the CLM, and to then idle on the selected channel. Further, the RAN itself may also be arranged to apply the same channel-selection process so as to determine the channel on which the subscriber device will idle in the coverage area.

The predefined channel-selection process may be a hashing algorithm keyed to an identifier of the subscriber device, such as a device serial number or directory number, to help randomize distribution of subscriber devices among the available channels. By way of example, the hashing algorithm may operate on the subscriber identifier to produce an index value that points to a particular place in the CLM and therefore identifies which channel to use. For instance, given a CLM that lists channels A, B, and C, a hash result of 0 to 0.33 may point to channel A, a hash result of 0.34 to 0.66 may point to channel B, and a hash result of 0.67 to 1.0 may point to channel C. As a simplified example, such an index value could be produced by taking one tenth of the last digit of the device's serial number, or taking one hundredth of the last two digits of the device's serial number. However, the details of the hashing algorithm are not critical. Further, other channel-selection processes could be applied as well.

In example implementation, one of the channels in a multi-channel coverage area may be deemed a primary channel on which the RAN will broadcast the CLM and subscriber devices will receive the CLM. (Alternatively, the CLM may be broadcast on each channel in the coverage area.) Each subscriber device may be provisioned with logic, such as a preferred roaming list (PRL), that directs the subscriber device to the applicable primary channel when the subscriber device enters into such a coverage area. The subscriber device may then read the CLM broadcast on that channel and may apply the defined channel-selection process to select one of the channels on which to idle. The CLM in this implementation may list both the primary channel and one or more secondary channels on which the RAN communicates in the coverage area. Thus, through application of a hashing algorithm or other channel-selection process, a subscriber device entering the coverage area can select one of the available channels on which to communicate with the RAN.

OVERVIEW

Application of a hashing algorithm or other channel-selection process may work well in many cases to allow a subscriber device to select a channel on which to idle or otherwise operate in a given coverage area. However, a problem can arise in a situation where the various channels on which the RAN operates a coverage area have different propagation characteristics and therefore do not all equally cover the location where the subscriber device is currently located.

For example, consider a scenario where a coverage area operates on primary channel A and secondary channel B, and where channel A tends to have stronger radio propagation than channel B. In that scenario, it is possible that a subscriber device at the edge of the coverage area may detect a pilot signal on channel A and may read a CLM on channel A and learn that channels A and B are available, and through application of a channel-selection process, the subscriber device may select channel B on which to operates. However, due to the weaker propagation of channel B, channel B may not extend to cover the location where the subscriber device is currently located. As a result of this, the subscriber device may be unable to communicate with the RAN on the selected channel and may, unfortunately, begin to roam on a competing service provider's network, fail to receive pertinent signaling messages, and/or lose battery power through repeated attempts to hash onto the selected channel.

This problem may be most likely to arise in a coverage area where channels are provided in substantially different profile frequency bands, such as one or more channels in the 800 MHz band and one or more channels in the 1.9 GHz band. A reason for this is that communications at such different frequencies tend to exhibit different levels of path loss. For instance, communications at 800 MHz tend to pass more easily through concrete and other building materials than communications at 1.9 GHz. Thus, if a coverage area provides service on an 800 MHz channel and also a 1.9 GHz channel, it is possible that a subscriber device at the edge of the coverage area may receive a CLM on the 800 MHz channel and may hash onto the 1.9 GHz channel but may then be unable to adequately receive RAN communications on the 1.9 GHz channel.

This problem is not necessarily limited to channels in such different frequency bands, however. There may be situations, for instance, where channels in a common frequency band exhibit different enough path loss to cause a similar issue.

Disclosed herein is a method and corresponding device or system to help increase the efficiency of channel selection in wireless communication system. The method stems from a realization that different channels may tend to exhibit different propagation characteristics, and that those differences may themselves differ from coverage area to coverage area, given different types of air interface obstructions in the coverage areas. Through engineering analysis of signal propagation in various areas, one can characterize the typical or likely difference between received signal strength of transmissions on one carrier frequency and received signal strength of transmissions on another carrier frequency. Through such analysis based on actual measurements or theoretical data, one can therefore specify an expected delta between such received signal strength on one channel and the received signal strength on another channel. This expected delta can be specified in decibels or in some other manner.

In accordance with the present method, a RAN will then be arranged to broadcast or otherwise transmit an indication of an expected delta in signal strength between two channels available for use in a given coverage area, and a subscriber device will receive that indication of expected delta. The subscriber device may then take a measurement of received signal strength on just one of those channels, say channel A, and may conveniently apply the received delta to that measurement in order to predict what the likely received signal strength would be on the other channel, say channel B, without the need to actually tune to and measure signal strength on that other channel. The subscriber device may then determine whether the thereby predicted signal strength of channel B is threshold low and, if so, the subscriber device may eliminate channel B from the channel-selection process. Due to the low predicted signal strength of channel B, the subscriber device may then select a channel other than channel B on which to communicate with the RAN.

This method can extend to apply with respect to all of the secondary channels listed in a CLM, where the subscriber device measures signal strength of the primary channel (or more generally can apply to multiple channels listed in the CLM, where the subscriber device measures signal strength of a given channel). The CLM or some other overhead message from the RAN can specify, for each secondary channel, an expected delta between signal strength of the secondary channel and signal strength of the primary channel. By applying the expected deltas to the measured signal strength of the primary channel, the subscriber device can then predict which if any of the listed secondary channels would likely provide inadequate signal strength and should therefore be excluded from the channel-selection process. Through this process, the subscriber device can effectively filter out of the channel-selection process any channel whose predicted signal strength would be too low, so that the channel-selection process will result in selection of a channel other than such filtered-out channel(s).

Based on engineering analysis such as that described above, the expected delta that a RAN specifies for a pair of channels (e.g., the expected delta between an 800 MHz channel and a 1.9 GHz channel) may differ from coverage area to coverage area due to variations in signal propagation differences among the coverage areas. This variation may be due to differences in likely air interface obstructions between the coverage areas. For instance, in an urban area that has many buildings or many air interface obstructions of a particular material, the expected delta between signal strength of an 800 MHz channel and signal strength of a 1.9 GHz channel may be much greater than in a rural area that has more free-space with fewer air interface obstructions. Thus, a RAN may be engineered to transmit a higher expected delta between such channels in an urban area than in a rural area.

In practice as noted above, after the subscriber device has applied an expected delta to compute a predicted signal strength of a given channel, the subscriber device may determine whether the predicted signal strength is threshold low such that the channel should be eliminated from the channel-selection process. To facilitate this, the subscriber device may receive from the RAN, or may otherwise be provisioned with, a threshold signal strength value. The RAN may provide this threshold value in the CLM or in another overhead signaling message in the coverage area, and the subscriber device may receive and apply the threshold value in the present method.

By having the RAN provide the threshold value, the RAN can be set to specify a particular threshold value that would tend to result in more likely or less likely elimination of typically-weaker channels from the channel-selection process if desired, such as dynamically at particular times of day or in response to channel-congestion situations for instance. Alternatively or additionally, a subscriber device could be provisioned with the threshold value, as a manufacturer-specified operating characteristic of the device for instance.

These as well as other aspects, advantages, and alternatives will become even more apparent to those of ordinary skill in the art by reading the following detailed description, with reference where appropriate to the accompanying drawings.

BRIEF DESCRIPTION OF THE DRAWINGS

FIG. 2 is an illustration of a channel list message specifying expected delta values in accordance with the method.

FIG. 5 is a simplified block diagram of a subscriber device arranged to implement the method.

DETAILED DESCRIPTION

Figure 1:
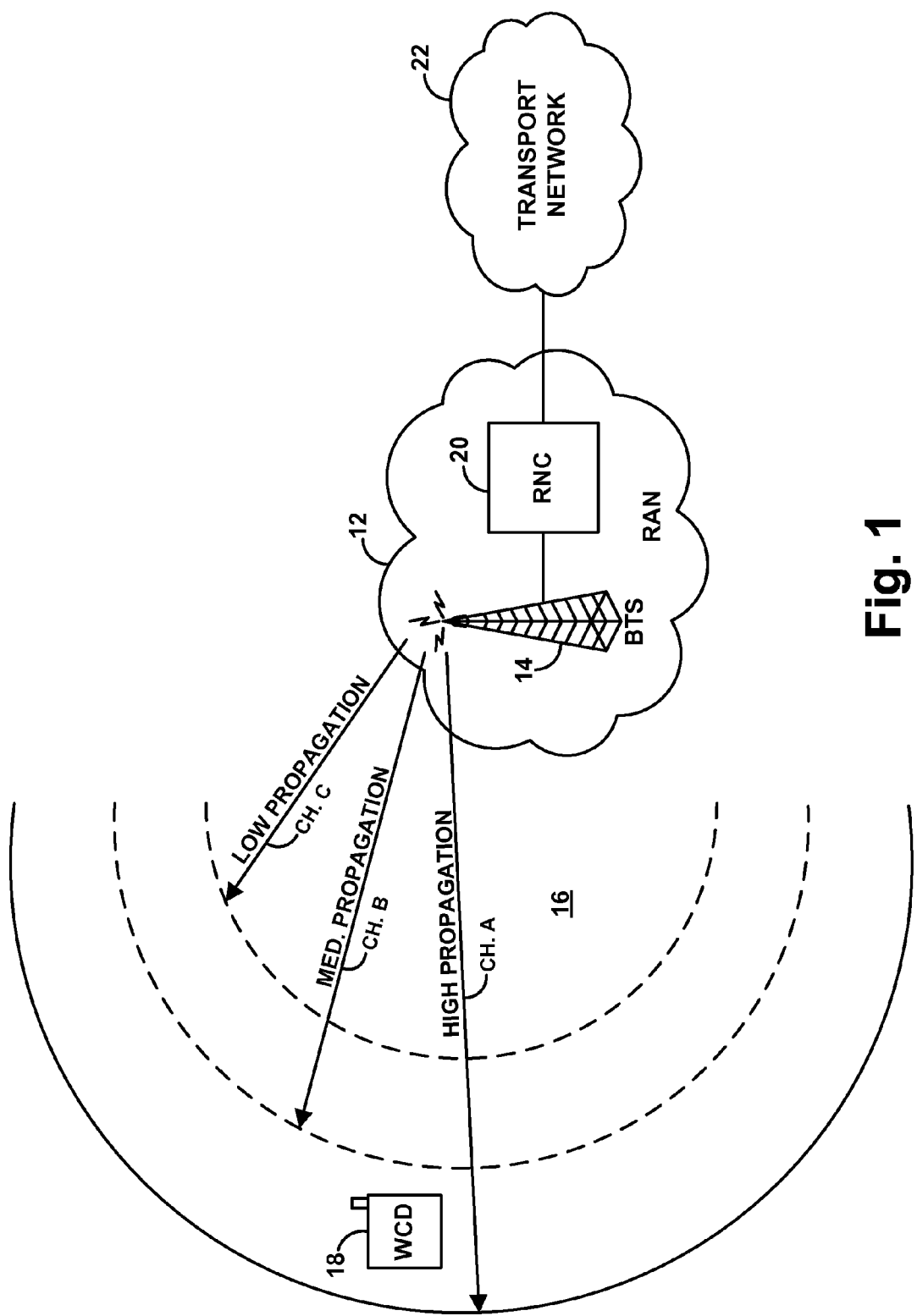
FIG. 1 is a simplified block diagram of communication system in which the present method can be implemented.

Referring to the drawings, as noted above, FIG. 1 is a simplified block diagram of an example communication system in which the present method can be implemented. As shown, the system includes a representative RAN 12 having a BTS 14 that radiates to define a coverage area 16 in which a representative wireless communication device (WCD) 18 is positioned. BTS 14 is shown coupled with an RNC 20, which is in turn coupled through one or more other entities (not shown) with a representative transport network 22.

It will be understood that this RAN arrangement is merely an example, and that numerous other arrangements are possible. As a general matter, the RAN need merely be structured in a manner that facilitates carrying out the present method. For instance, the RAN may be structured to radiate so as to define a coverage area in which the RAN communicates on multiple channels, and the RAN may broadcast a CLM and provide expected delta values to allow WCD 18 to be able to predict that a channel will have low signal strength and consequently to select another channel on which to communicate with the RAN.

RAN 12 may be operated by a wireless service provider to which WCD 18 (or a user of WCD 18) subscribes for service. RAN 12 and WCD 18 may then be arranged to engage in air interface communication with each other according to one or more agreed air interface protocols, examples of which include CDMA 1xRTT, CDMA 1xEV-DO, WiMAX, LTE, IDEN, GSM, HSPA, and others now known or later developed.

FIG. 1 depicts BTS 14 radiating to define a coverage area 16, in which the BTS communicates on three representative channels, A, B, and C. The figure shows these channels as having different ranges, likely due to differences in signal propagation through air interface obstructions in the coverage area. In particular, channel A is shown extending to the farthest edge of the coverage area, effectively defining the border of the coverage area, channel B is shown extending a somewhat shorter distance, and channel C is shown extending a still shorter distance.

As discussed above, this difference in signal propagation may be a result of difference in carrier frequency. For instance, channel A may be an 800 MHz channel, which tends to propagate relatively easily through certain air interface obstructions such as concrete, channel B may be a 1.9 GHz channel, which may have more difficulty propagating through such obstructions, and channel C may be a 2.4 GHz channel, which may have still more difficulty propagating through such obstructions.

In actual implementation, the actual extent of coverage provided on each of these channels will not be as discrete as shown in the figure. For instance, coverage provided by a given channel will likely fade out, over a distance. The arrow shown in FIG. 1 respectively for each channel might represent how far typically-adequate coverage of the carrier extends from the BTS. Although less adequate or inadequate coverage on the channel might actually extend somewhat beyond the arrowhead. Further, the arc of coverage defined by the coverage area and by coverage provided on each channel is not likely to be as even as shown in the figure, as it will vary based on air interface obstructions and other signal propagation issues.

More generally, the channel arrangement shown in FIG. 1, like the network arrangement of FIG. 1 as a whole, is merely an example, intended to simplify the discussion. In practice, a RAN may operate on more or fewer channels in a given coverage area than the number shown in the figure. Further, in a multi-channel coverage area, more than one of the channels may be within a given band. For instance, in a given coverage area, a RAN might be engineered to operate on a total of six channels, such as three distinct channels in the 800 MHz band, two distinct channels in the 1.9 GHz band, and one channel in the 2.5 GHz band. Many other examples are possible as well.

To provide service on multiple channels as illustrated, a BTS may be equipped with transmitters, antennas, and associated logic to drive communications respectively on each channel. Further, the BTS and/or a controlling RNC (generally the RAN) would preferably be equipped with logic to facilitate selective communication on a given channel, such as to broadcast a page message on a particular channel on which a target subscriber device is understood to be idling, and to receive and process communications on a particular channel.

In the illustrated arrangement, channel A may be deemed a primary channel in the coverage area, and the RAN may be set to broadcast on that channel (e.g., on a defined overhead sub-channel such as a sync channel or the like) a CLM that lists the channels on which the RAN communicates in the coverage area. (As noted above, such a CLM could be broadcast on other channels as well or instead.) This CLM may list the various channels in a manner that allows a recipient device such as WCD 18 to be able to evaluate, tune to and operate on a selected channel.

In practice, for instance, the RAN and WCD may be provisioned with data that specifies a channel number or other identifier respectively for each of various possible channels and that correlates the identifier with channel information such as center frequency (or frequencies for forward-link and reverse-link). Further, the channel numbers may be classified by band class, such as by having a particular range or form of channel numbers designate channels in the 800 MHz band, another range or form of numbers designate channels in the 1.9 GHz band, and still another range or form of numbers designate channels in the 2.5 GHz band.

In the arrangement of FIG. 1, we may assume for simplicity that the CLM broadcast by the RAN on primary channel A will set forth a list {A, B, C}, to indicate that the RAN operates on channels A, B, and C in the coverage area. The values A, B, and C may be channel identifiers as noted above, which the WCD can correlate with applicable frequencies and/or other channel parameters. Alternatively, the values A, B, and C could more expressly designate the channels.

As noted above, in accordance with the present method, RAN 12 may further transmit to WCD 18 one or more expected delta values that the WCD can apply in order to predict signal strength that the WCD is likely to receive on one or more channels from the RAN. RAN 12 may provide these expected delta values in any overhead message or in some other manner. For instance, the RAN can provide the expected delta values in the CLM itself, as additional data characterizing at least each secondary channel. FIG. 2 is an illustration of an example CLM showing this arrangement.

In FIG. 2, a CLM designates an expected delta value respectively for each secondary channel B and C as compared with signal strength that the WCD will measure on primary channel A. In particular, the CLM lists channel A without an expected delta value, the CLM lists channel B with an expected delta value $\Delta_{A-B}$, and the CLM lists channel C with an expected delta value $\Delta_{A-C}$. (These expected delta values may be negative values to represent the extent to which the secondary channel will likely have more path loss, and will thus likely result in weaker received signal strength, than the primary channel.) Although the figure shows the expected delta values conceptually as variables, the CLM in this implementation may list actual values, such as decibel (dB) values for a comparison between signal strength measured in decibels relative to milliwatt (dBm) for instance. Further, it will be understood that a representative delta value can be a mathematical difference, a percentage difference, or any other indication of the extent to which one differs from the other.

Given such expected delta values, the WCD can take a measurement of actual received signal strength, S, on primary channel A, and the WCD can apply the expected deltas to predict that the WCD would likely receive a signal strength of $S+\Delta_{A-B}$ on secondary channel B, and that the WCD would likely receive a signal strength of $S+\Delta_{A-C}$ on secondary channel C. Using actual numbers for instance, if the WCD measures an actual received signal strength of −105 dBm on primary channel A and if $\Delta_{A-B}$ is −6 dB, the WCD may calculate that the expected received signal strength on channel B is −105−6=−111 dBm. Likewise, if the WCD measures an actual received signals strength of −105 dBm on primary channel A and if $\Delta_{A-C}$ is −10 dB, the WCD may calculate that the expected received signal strength on channel C is −105−10=−115 dBm.

As noted above, these expected delta values can come from engineering analysis of signal propagation in the coverage area. For instance, through drive-testing or other field testing, actual measurements of received signal strength can be taken on each channel, or at least in each profile frequency band, at various locations throughout the coverage area, and comparisons can be made between the measurements. Rolling up those comparisons, such as averaging them, can then give representative measurements of expected differences between received signal strength on one channel (e.g., a channel in a given band) and signal strength on another channel (e.g., a channel in another band). As such, it is understood that these expected delta values are likely imperfect but are mere estimates, preferably based on engineering analysis but alternatively based on theoretical analysis given knowledge of signal propagation tendencies on one carrier frequency versus another.

Network engineers can then provision a RAN to broadcast the applicable data for the channels in a given coverage area, so that WCDs in that coverage area can use the expected delta values to predict likely signal strength on one or more channels in accordance with the present method.

Although FIG. 2 depicts expected delta values being specified separately for the comparison of channels A and B and for the comparison of channels A and C, expected delta values can be specified in other ways, and the application of the expected delta values can in turn take other forms. For instance, an expected delta value could be specified for the comparison of channels A and C, and an expected delta value could be separately specified for the comparison of channels B and C. Specifying those two expected deltas may implicitly constitute specifying a delta between channels A and B. For example, if $\Delta_{A-C}$ is −10 dB and $\Delta_{B-C}$ is −4 dB, a recipient WCD can compute that $\Delta_{A-B}$ is −6 dB.

In addition, if we assume that the expected delta between any channel in one band (e.g., 800 MHz) and any channel in another band (e.g., 1.9 GHz) is likely to be largely the same as the expected delta between any other channel on the first band and any other channel in the second band, then the RAN can specify expected delta values as between bands generally. For instance, the RAN can broadcast an delta value expected for the difference between signal strength on an 800 MHz channel and signal strength on a 1.9 GHz channel. A recipient WCD can then apply that expected delta with respect to channels in the indicated bands (as indicated by their channel numbers for instance).

In practice, the WCD 18 may take a measurement of actual received signal strength on the channel deemed to be the primary channel, for which the RAN may not have specified an expected delta but may have deemed the reference channel for purposes of predicting signal strength on one or more other channels. In an alternative arrangement, however, the WCD may instead take a measurement of actual signal strength on one of the channels for which the RAN specified an expected delta with respect to some other channel, and the WCD may then apply the expected delta in the other direction. For instance, in the example above, where the RAN does not specify an expected delta for channel A but specifies for channel B an expected delta of −6 dB with respect to channel A, the WCD can measure actual received signal strength on channel B and apply a positive expected delta of 6 dB to predict signals strength of channel A.

Ideally, the WCD will measure the actual signal strength on the channel on which the WCD receives the CLM. As noted above, this can be the primary channel. However, for one reason or another, it may instead be another channel on which the RAN provides service in the coverage area.

Further, although this discussion has focused on consideration of decibel values and received signals strength represented by decibel values, the method can apply as well with respect to signal strength measured in other ways, such as signal-to-noise ratio, frame error rate (or the inverse of frame error rate), for example.

In accordance with the present method, after WCD 18 predicts signal strength on a particular channel, the WCD will preferably determine whether the predicted signal strength is threshold low such that service on the channel may be inadequate. As noted above, the WCD may perform this analysis by comparing the predicted signal strength with a threshold value that the WCD receives from the RAN or that is otherwise provisioned in the WCD. If the RAN provides the threshold value, the RAN may provide the value in an overhead signaling message. For instance, the RAN may provide the value in the CLM as well.

As noted above, having the RAN specify the threshold value for use in a given coverage area can provide a mechanism for the RAN (e.g., the wireless service provider) to control the extent to which subscriber devices use potentially weaker channels. In a situation where likely stronger channels are particularly congested in the coverage area, a programmed processor at the BTS, RNC or other RAN infrastructure could dynamically reduce the threshold value to make it easier for a WCD to accept a lower predicted signal strength of a given channel.

On the other hand, there may be a practical limit to signal strength necessary for the WCD to function. Such a low threshold limit may be dictated by manufacturer specifications for the WCD (e.g., as a receive-sensitivity of the WCD), and the WCD may be programmed to apply such a lower-bound threshold, even if the RAN specifies a stronger power level as the threshold. Alternatively, the WCD be otherwise programmed to apply a particular threshold.

In accordance with the present method, once WCD has applied an expected delta to measured signal strength to predict signal strength of a given channel, the WCD may decide whether to eliminate the channel from the WCD's channel-selection process. That is, due to the channel's predicted signal strength being threshold low, the WCD may select a channel other than that channel.

To do this in practice, the WCD may effectively remove the channel from the list provided by the CLM and may then apply the channel-selection process with respect to the remaining channel(s). For instance, if through application of the method with respect to channel list {A, B, C} the WCD predicts that the signal strength of channel B will be threshold low, the WCD may filter channel B out of the CLM and apply the channel-selection process with respect to the set {A, C} instead. This would result in selection of a channel other than channel B.

At a limit, this method could potentially result in elimination of all of but one of the channels from the channel-selection process. In that case, applying the channel-selection process would of course result in selection of the sole remaining channel. The WCD in that situation can forego actual application of the channel-selection process, which can be considered implicit application of the channel-selection process with the result being selection of the sole remaining channel.

As noted above, a WCD and the RAN may normally be set to apply the same channel-selection process so that the RAN will determine which channel the WCD will be idling on and the RAN can then target any page messages to the WCD on that channel. With the present method, if the WCD eliminates a channel from the channel-selection process, there may be a need for the WCD to notify the RAN which channel the WCD has selected. This can be done in various ways. By way of example, the WCD can simply transmit a registration message to the RAN on the selected channel, and the RAN can treat that registration as an implicit indication that the WCD selected the channel. As another example, the WCD can transmit to the RAN a special access probe message (or parameter in some other existing message) to inform the RAN which channel the WCD selected. For instance, the WCD can transmit to the RAN an identification of the one or more channels that the WCD eliminated from the channel-selection process, and the RAN can similarly eliminate the identified channel(s) from the channel-selection process so as to select the same channel that the WCD selected. Or the WCD can transmit to the RAN an identification the actual channel selected by the WCD.

In the event the channel that the WCD selects would be the same channel that the WCD would select if the WCD had not applied the present method, the WCD may forego notifying the RAN, as the normal channel-selection process can apply at the RAN. To determine whether this is the case, the WCD may programmatically apply the channel-selection process both with and without application of the present method. If the results are different, then the WCD may inform the RAN. Whereas, if the results are the same, then the WCD may forego informing the RAN.

Figure 3:
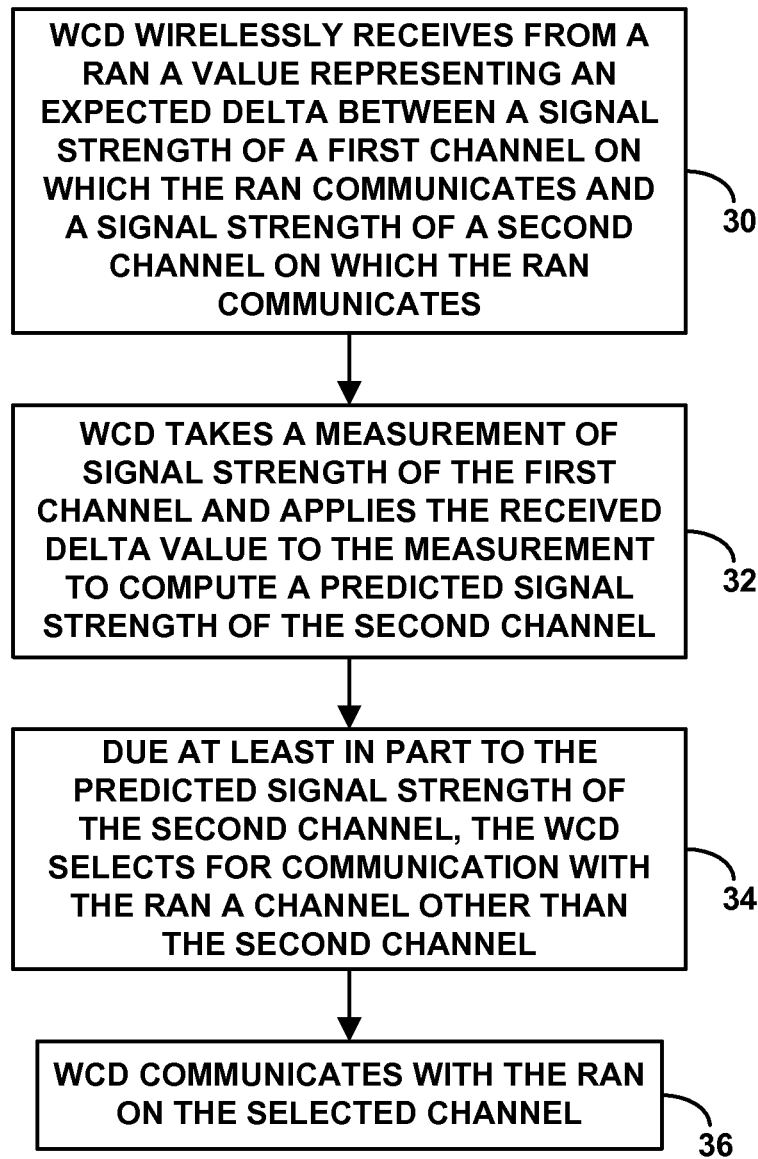
FIG. 3 is a flow chart depicting functions that can be carried out in accordance with the method.

Referring next to FIG. 3, a flow chart is provided to illustrate in summary some of the functions that can be carried out in accordance with the present method. As shown in FIG. 3, at block 30, a WCD wirelessly receives from a RAN a value representing an expected delta between a signal strength of a first channel on which the RAN communicates and a signal strength of a second channel on which the RAN communicates. At block 32, which may occur before or after block 30, the WCD takes a measurement of signal strength of the first channel, such as a measurement of pilot signal strength (e.g., RSSI, measured in dBm for example), and the WCD applies the received delta value to the measurement to compute a predicted signal strength of the second channel. At block 34, due at least in part to the predicted signal strength of the second channel, the WCD selects for communication with the RAN a channel other than the second channel. And at block 36, the WCD communicates with the RAN on the selected channel, such as by monitoring signals from the RAN on the selected channel for instance.

Figure 4:
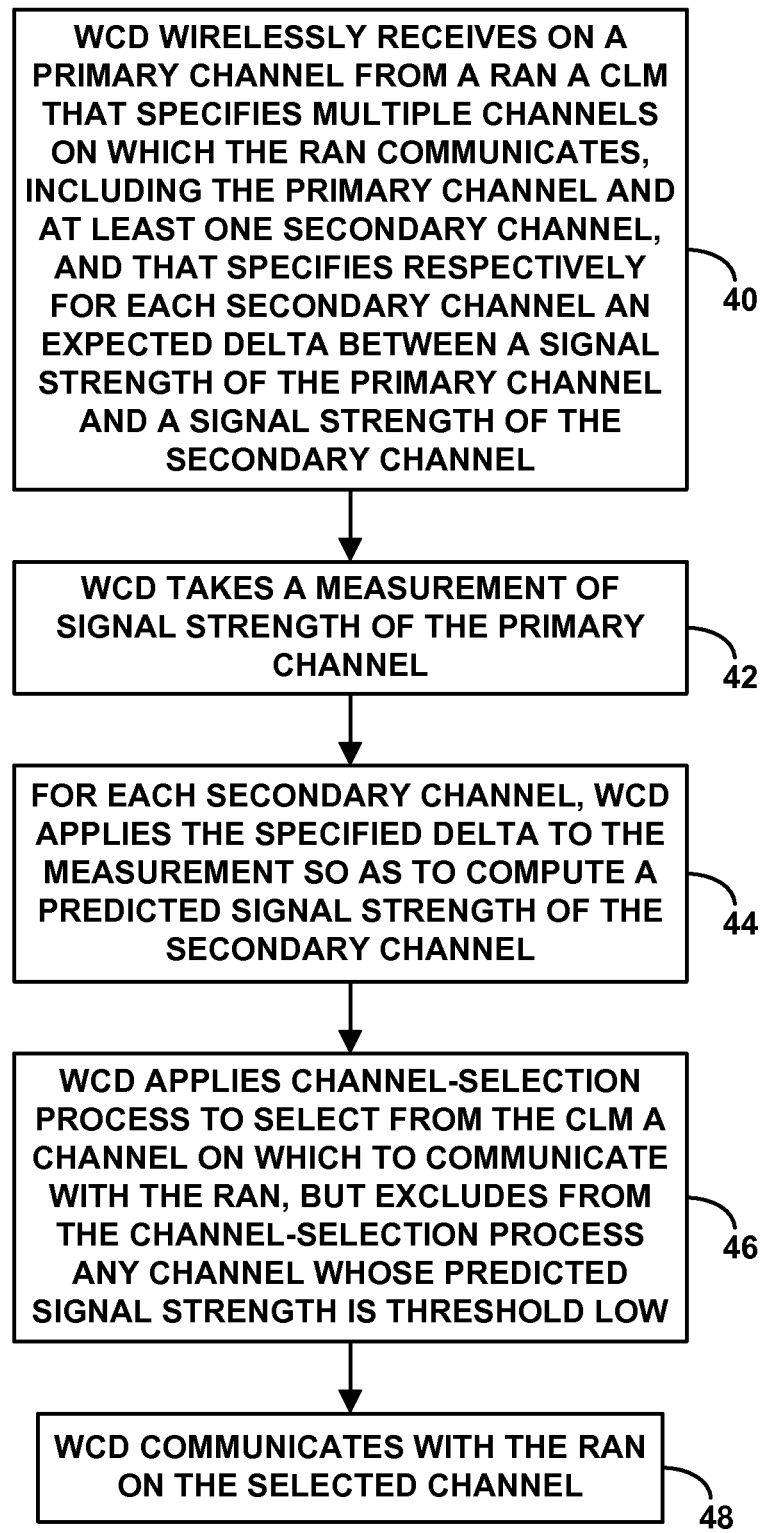
FIG. 4 is another flow chart depicting functions that can be carried out in accordance with the method.

Referring next to FIG. 4, another flow chart is provided to illustrate in summary some of the functions that can be carried out from another perspective in accordance with the present method. As shown in FIG. 4, at block 40, a WCD wirelessly receives on a primary channel from a RAN a CLM that specifies multiple channels on which the RAN communicates, including the primary channel and at least one secondary channel, and that specifies respectively for each secondary channel an expected delta between a signal strength of the primary channel and a signal strength of the secondary channel. At block 42, which may occur before or after block 40, the WCD takes a measurement of signal strength of the primary channel. At block 44, respectively for each secondary channel, the WCD then applies the specified delta to the measurement so as to compute a predicted signal strength of the secondary channel. At block 46, the WCD then applies a channel-selection process to select from the CLM a channel on which to communicate with the RAN, but excludes from the channel-selection process any channel whose predicted signal strength is threshold low. And at block 48, the WCD communicates with the RAN on the selected channel.

Referring next to FIG. 5, a simplified block diagram of a WCD is provided, to show some of the functional components that can be included in such a WCD to carry out the present method. This WCD may be a user-operated device (such as a cell phone or wirelessly equipped computer) or an autonomously operated device (such as a package tracking device or embedded telemetry device for instance). As shown, the example WCD includes a wireless communication interface 50, a processor 52, and data storage 54, which may be coupled together by a system bus or other connection mechanism 56.

Wireless communication interface 50 functions to engage in air interface communication with a RAN and is preferably arranged to receive on a first air interface channel from the RAN a channel list message that specifies a plurality of channels on which the RAN communicates, including the first channel and at least one second channel, and that specifies respectively for each second channel an expected delta between a signal strength of the first channel and a signal strength of the second channel.

The example WCD may then be arranged to carry out various additional functions of the present method, through logic implemented by the wireless communication interface 60 (such as logic encoded on a wireless communication chipset in the WCD) and/or through logic stored in data storage 54 and executed by processor 52 (e.g., program logic).

Functions that can be carried out include those discussed above, such as (i) taking a measurement of signal strength of the first channel, (ii) predicting a signal strength respectively of each second channel by applying to the measurement the expected delta specified for the second channel, (iii) applying a channel-selection process to select a channel from the CLM but to exclude from the channel-selection process any channel whose predicted signal strength is threshold low, and (iv) communicating with the RAN on the selected channel.

An exemplary embodiment of the present method has been shown and described. Those of ordinary skill in the art will appreciate that numerous modifications from the embodiment described are possible, while remaining within the scope of the claims.

We claim:

1. A method comprising:
   a wireless communication device (WCD) wirelessly receiving from a radio access network (RAN) a channel list message (CLM) specifying a plurality of channels on which the RAN engages in air interface communication, the plurality of channels including a first channel and a second channel;
   the WCD receiving from the RAN a value representing an expected delta between a signal strength of the first channel and a signal strength of the second channel;
   the WCD taking a measurement of signal strength of the first channel, and the WCD applying the received delta value to the measurement to compute a predicted signal strength of the second channel;
   due at least in part to the predicted signal strength of the second channel, the WCD selecting for communication with the RAN, from the specified plurality of channels, a channel other than the second channel; and
   the WCD communicating with the RAN on the selected channel.

2. The method of claim 1, wherein selecting the channel other than the second channel due at least in part to the predicted signal strength of the second channel comprises:
   determining that the predicted signal strength is lower than a threshold value; and
   responsive to the determining, eliminating the second channel from a channel selection process applied by the WCD.

3. The method of claim 1, wherein the WCD normally applies a hashing process for channel selection, and wherein selecting the channel other than the second channel due at least in part to the predicted signal strength of the second channel comprises:
   determining that the predicted signal strength is lower than a threshold value;
   responsive to the determining, eliminating the second channel from the hashing process; and
   applying the hashing process, with the second channel thereby eliminated, to select the channel other than the second channel.

4. The method of claim 3, further comprising:
   the WCD receiving the threshold value wirelessly from the RAN.

5. The method of claim 4, wherein the received CLM specifies the delta value and the threshold value.

6. The method of claim 1, wherein the received CLM specifies the delta value.

7. The method of claim 1,
   wherein wirelessly receiving the CLM comprises wirelessly receiving the CLM on the first channel.

8. The method of claim 1, wherein each channel defines a frequency block.

9. A method comprising:
   a wireless communication device (WCD) wirelessly receiving on a primary channel from a radio access network (RAN) a channel list message (CLM), the CLM specifying a plurality of channels on which the RAN communicates, including the primary channel and at least one secondary channel, and specifying respectively for each secondary channel an expected delta between a signal strength of the primary channel and a signal strength of the secondary channel;
   the WCD taking a measurement of signal strength of the primary channel;
   respectively for each secondary channel, the WCD applying the specified delta to the measurement so as to compute a predicted signal strength of the secondary channel;
   the WCD applying a channel-selection process to select from the CLM a channel on which to communicate with the RAN, but excluding from the channel-selection process any channel whose predicted signal strength is threshold low; and
   the WCD communicating with the RAN on the selected channel.

10. The method of claim 9, wherein excluding from the channel-selection process any channel whose predicted signal strength is threshold low comprises, for each secondary channel:
    making a determination of whether the predicted signal strength is lower than a threshold value;
    if the determination is that the predicted signal strength is lower than the threshold value, then excluding the secondary channel from the channel-selection process; and
    if the determination is that the predicted signal strength is not lower than the threshold value, then not excluding the secondary channel from the channel-selection process.

11. The method of claim 10, further comprising the WCD wirelessly receiving the threshold value from the RAN.

12. The method of claim 11, wherein the CLM specifies the threshold value, and wherein making the determination of whether the predicted signal strength if lower than the threshold value comprises comparing the predicted signal strength with the threshold value specified by the CLM.

13. The method of claim 9, wherein the WCD has a device identifier, and wherein the channel-selection process comprises a hashing process keyed to the device identifier.

14. The method of claim 9, further comprising:
the WCD notifying the RAN of exclusion of any secondary channel from the channel-selection process.

15. The method of claim 9, further comprising:
the WCD notifying the RAN of the selected channel.

16. The method of claim 9, wherein communicating with the RAN on the selected channel comprises idling on the selected channel.

17. A wireless communication device (WCD) comprising:
a wireless communication interface for engaging in air interface communication with a radio access network (RAN), wherein the wireless communication interface is arranged to receive on a first air interface channel from the RAN a channel list message that specifies a plurality of channels on which the RAN communicates, including the first channel and at least one second channel, and that specifies respectively for each second channel an expected delta between a signal strength of the first channel and a signal strength of the second channel,
the WCD being arranged to take a measurement of signal strength of the first channel,
the WCD being arranged to predict a signal strength respectively of each second channel by applying to the measurement the expected delta specified for the second channel,
the WCD being arranged to apply a channel-selection process to select a channel from the CLM but to exclude from the channel-selection process any channel whose predicted signal strength is threshold low, and
the WCD being arranged to then communicate with the RAN on the selected channel.

18. The WCD of claim 17, wherein the wireless communication interface is arranged to take the measurement, predict the signal strength respectively of each second channel, apply the channel-selection process, and communicate with the RAN on the selected channel.

19. The WCD of claim 17, wherein the WCD is arranged to wirelessly receive from the RAN a threshold value, and wherein the WCD excludes from the channel-selection process any channel whose predicted signal strength is threshold low by, for at least each second channel:
comparing the predicted signal strength of the second channel with the received threshold value and thereby making a determination of whether the predicted signal strength is threshold low;
if the determination is that the predicted signal strength is threshold low, then excluding the second channel from the channel-selection process; and
if the determination is that the predicted signal strength is not threshold low, then not excluding the second channel from the channel-selection process.

* * * * *